J. M. ALLISON.
Corn Planter.

No. 78,039.

Patented May 19, 1868.

Witnesses:
H. C. Ashkettle
J. A. Fraser

Inventor:
J. M. Allison
per Munn & Co.
Attorney

United States Patent Office.

J. M. ALLISON, OF CRANBERRY, PENNSYLVANIA.

*Letters Patent No. 78,039, dated May 19, 1868.*

---

IMPROVEMENT IN CORN-PLANTERS.

---

*The Schedule referred to in these Letters Patent and making part of the same.*

---

TO ALL WHOM IT MAY CONCERN:

Be it known that I, J. M. ALLISON, of Cranberry, in the county of Venango, and State of Pennsylvania, have invented a new and useful Improvement in Corn-Planter; and I do hereby declare that the following is a full, clear, and exact description thereof, which will enable others skilled in the art to make and use the same, reference being had to the accompanying drawings, forming part of this specification.

Similar letters of reference indicate corresponding parts.

Figure 1:
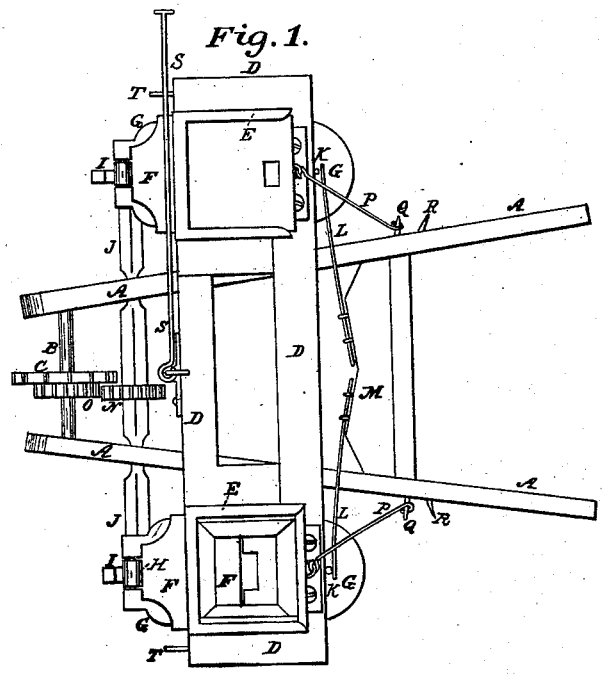
Figure 1 is a top view of my improved corn-planter.

My invention has for its object to furnish a simple, convenient, and effective machine, by means of which corn may be dropped accurately and rapidly by hand-power; and it consists in the construction and combination of the various parts, as hereinafter more fully described.

A is the frame of the machine, B is the axle, and C is the wheel, all of which are similar in construction and arrangement to the frame, axle, and wheel of an ordinary wheel-barrow, except that the surface of the wheel C has cogs or projections formed upon it, to enable it to take a surer hold upon the ground, and prevent its slipping. D is the bed-plate, which is attached to the side bars of the frame A.

The end parts of the bed-plate D are cut away to receive the hoppers E, which are hinged at their rear sides to the rear part of the bed-plate D.

F is a gauge-slide, forming the forward part of the bottom of the hopper, the edges of which slide in grooves formed in the sides of the hoppers, so that it may be adjusted to allow any desired amount of corn to pass out at a time.

G is a slide-board, sliding in grooves in the sides of the hoppers E beneath the bed-plate D, and which is of such a length that its ends may project in front and rear of said bed-plate, as shown in the drawings.

Figure 2:
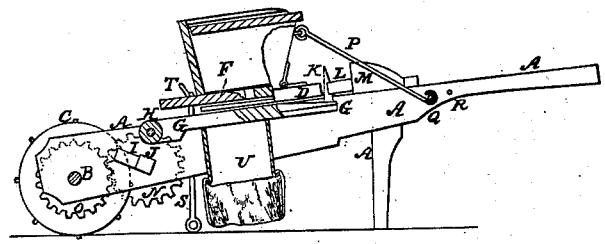
Figure 2 is a side view of the same, part being broken away to show the construction.

The rear part of the slide G is slotted, as shown in fig. 2, through which slot, when the said slide is pushed forward, the corn drops to the ground.

To the rear end of each of the slides G is pivoted a small friction-roller, H, as shown in figs. 1 and 2, for the arms or cams I, formed upon or attached to the ends of the shaft J, to act upon, to push the said slides forward to drop the corn.

To the rear ends of the slides G are attached upwardly-projecting pins or arms, K, against which the free ends of the springs L rest, to push the said slides back when released from the arms or cams I. The other ends of the springs L are attached to the block M, which is secured to the frame A.

The shaft J revolves in bearings in the frame A, and to its middle part is attached a gear-wheel, N, the teeth of which mesh into the teeth of the gear-wheel O, formed upon or attached to the side of the drive-wheel C, so that the dropping slides G may be operated to drop the corn by the advance of the machine.

The circumference of the drive-wheel C should equal the distance which the hills are desired to be apart, and the hoppers E should be at the same distance apart, so that the corn may be planted in check-row.

When the machine is in operation, the hoppers are braced against the pressure of the arms or cams I by the brace-rods P, one end of which is pivoted to the side of the hopper, and the other ends of which have eyes formed upon them, which pass over pins Q, attached to the side of the frame or handles A, so as to securely brace the hoppers in place.

R is another set of pins, placed a little in the rear of the pins Q, so that by hooking the ends of the brace-rods P upon the pins R, the hoppers E will be held up, so that the arms or cams I cannot strike the slides G. This enables the machine to be moved from place to place without operating the said slides G.

S is a rod, the inner end of which is swivelled to the rear edge of the middle part of the bed-plate D, and the forward end of which is bent down, so that when extended to the side of the frame A, as shown in figs. 1 and 2, it may serve as a guide in returning, and cause all the rows to be at the same distance apart.

T are stops or guides attached to each side of the frame A, so as to hold the said rod S in place when turned to either side.

U are open boxes attached to the under side of the bed-plate, to guide the corn as it drops to the ground.

Further security against the seeds being scattered or blown out of place may be obtained by attaching an open sack, V, to the lower end of each of the open boxes U, as shown in fig. 2.

I claim as new, and desire to secure by Letters Patent—

1. The combination of the gear-wheels O and N, shaft J, cams or arms I, slotted slides G, and springs L, with the drive-wheel C, frame A, and hoppers E, substantially as herein shown and described, and for the purpose set forth.

2. The combination of the adjustable slide bottom F with the hoppers E and slotted slide G, substantially as herein shown and described, and for the purpose set forth.

J. M. ALLISON.

Witnesses:
J. W. SMULLIN,
H. I. MONG.